No. 777,710. PATENTED DEC. 20, 1904.
C. C. WRIGHT.
STEERING MECHANISM FOR MOTOR ROAD VEHICLES.
APPLICATION FILED JAN. 15, 1904.
NO MODEL.
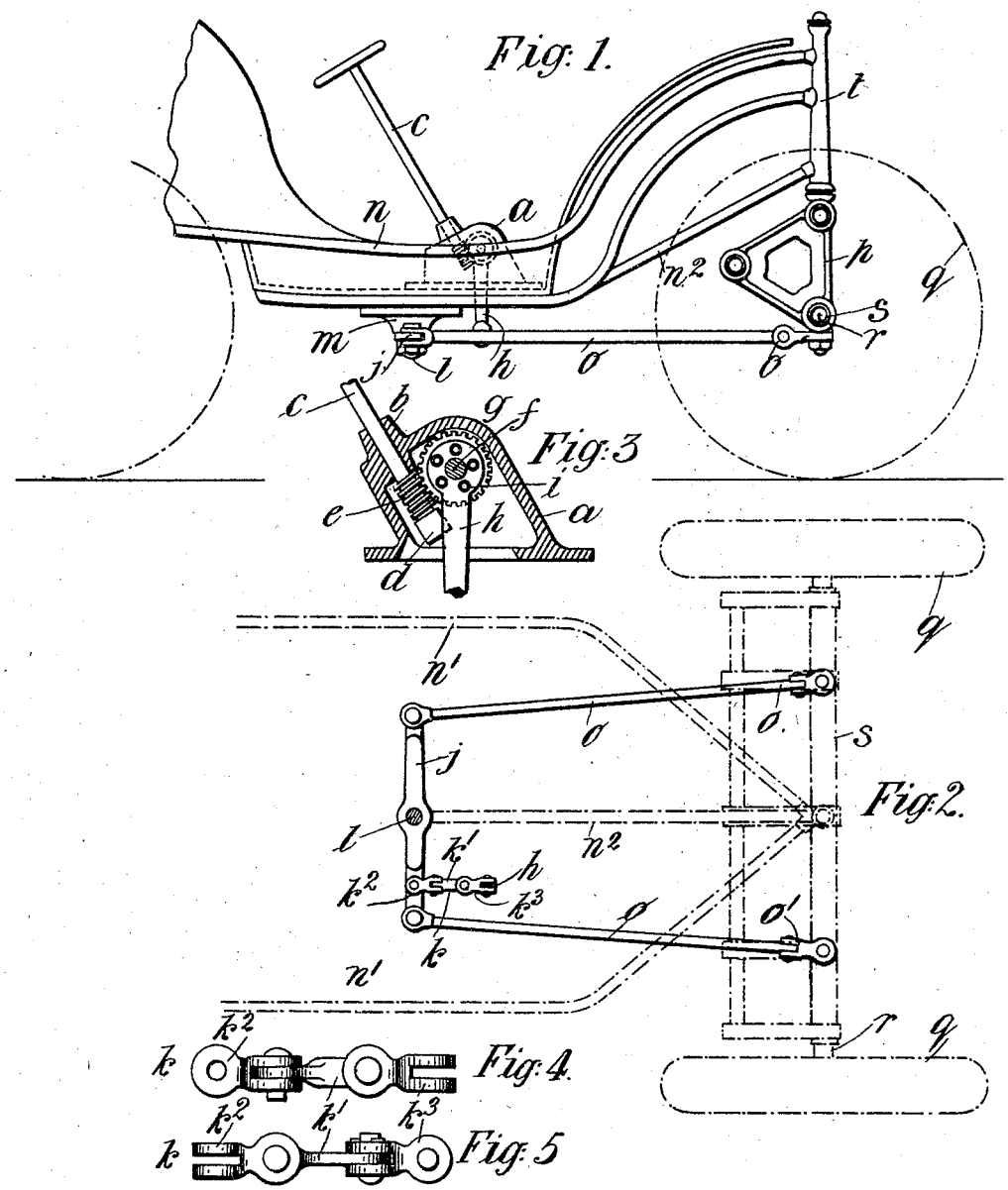
Witnesses—
Ellis Owen
John Smith
Inventor
C. C. Wright
by W. E. Evans
Attorney.

No. 777,710.

Patented December 20, 1904.

UNITED STATES PATENT OFFICE.

CHARLES C. WRIGHT, OF LONDON, ENGLAND.

STEERING MECHANISM FOR MOTOR ROAD-VEHICLES.

SPECIFICATION forming part of Letters Patent No. 777,710, dated December 20, 1904.

Application filed January 15, 1904. Serial No. 189,163.

*To all whom it may concern:*

Be it known that I, CHARLES COLEMAN WRIGHT, a subject of the King of Great Britain and Ireland, residing at 3 St. Mary's Grove, Gunnersbury, London, England, have invented certain new and useful Improvements in and Relating to Steering Mechanism for Motor Road-Vehicles, of which the following is a specification.

This invention relates to steering mechanism for motor road-vehicles, and has for its object to provide simple and effective means for positively setting the position of the steering-wheels so as to preclude the possibility of their dislocation on striking any obstacle in the way; and with this object the invention is more especially applicable to motor road-vehicles having a front drive, in the application to which a further object is to avoid the tendency to side slipping or skidding and generally to provide motor road-vehicles which can be positively controlled and which even with heavy loads are capable of being driven at relatively high speeds without danger from side slipping or skidding or from the dislocation of the steering mechanism, which is a frequent cause of accidents in motor road-vehicles as now generally provided.

According to the invention means are provided for giving to the steering-wheel axle or to the fore-carriage upon which the motor is mounted a position which is positively maintained notwithstanding the impact of any obstruction against either of the steering-wheels. According to the invention, moreover, a lever is provided which is connected to the steering-axle tube or to the fore-carriage by means of rods respectively connected to the ends thereof, the movement of such lever being effected and determined by means of a lever whose angular position is determined by such means as a worm and worm-wheel gear and whose extremity is connected to the first lever aforesaid by means of a jointed member which permits of relative movement in horizontal and vertical planes. The respective steering-rods are also jointed to permit of the relative movement of the connected parts in a vertical plane.

The invention is illustrated in the accompanying drawings, in which—

Figure 1 represents a front elevation of a motor road-vehicle provided according to the invention. Fig. 2 is a plan corresponding to Fig. 1, showing the steering mechanism in full lines and the vehicle parts in dotted lines. Fig. 3 is a detail sectional elevation, on a larger scale, of the worm and worm-wheel gear employed in the construction illustrated in Figs. 1 and 2, while Figs. 4 and 5 are plan and elevation, respectively, on a larger scale, of the jointed member indicated in Fig. 2.

The invention is shown in the drawings as applied to a light vehicle, but may be applied to heavy vehicles which require to be driven at a high speed and prevented from side slipping, and the manner in which the invention is carried into effect as applied to such vehicles differs in no essential respect from its application to light vehicles, as illustrated.

In carrying the invention into effect in its application to a light vehicle, as illustrated in the accompanying drawings, I provide a light box or receptacle $a$, having an inclined and relatively long bearing $b$ for receiving the steering-post $c$, and with a foot-step bearing $d$ for the reception of the lower extremity of the said steering-post. Upon the lower extremity of the steering-post and between the bearing $b$ and the foot-step bearing $d$ I provide a worm $e$. I also carry upon said box or casing $a$ a horizontal spindle $f$, upon which I mount a worm-wheel $g$ and a lever $h$, which I advantageously render integral with said worm-wheel $g$ by bolting the one to the other by means of bolts $i$, as illustrated in Fig. 3. The lower extremity of the lever $h$ is connected to a horizotally-disposed lever $j$ by means of a jointed member $k$. The horizontally-disposed lever $j$ is carried upon a pin $l$, advantageously provided upon a bracket $m$, which is securely fixed to the frame $n$ of the carriage in any suitable manner. The jointed member $k$ is provided with an intermediate section $k'$, which is jointed to another section, $k^2$, by a joint permitting vertical movement and at the other extremity with a section $k^3$ permitting horizontal movement, so that thus the horizontally-disposed lever *j* may have a relative movement without affecting the lever *h*. Steering-rods *o* are respectively connected to the extremities of the lever *j*, and their opposite ends are pivotally connected to the fore-carriage *p*, upon which the motor and the speed-reducing gear and the other parts may be mounted in any convenient manner entirely apart from the present invention. The rods *o* are advantageously jointed at *o'* to permit of the relative movement of the fore-carriage in a vertical plane.

In the illustrated construction the steering-wheels *q* are mounted upon an axle *r*, which latter is carried within a tube *s*, forming part of the fore-carriage *p*, the fore-carriage being capable of rotation around a centrally-disposed steering-tube socket *t*, to which the vehicle-frame *n* is connected. In the illustrated example the frame is constituted of tubes *n n*, which are diverted inwardly and connected to the steering-tube socket *t*, while the centrally-disposed tubular member $n^2$ of the frame is connected to the socket *t* toward the lower extremity. It will, however, be understood that the invention does not relate to the illustrated construction of the frame.

In the operation of the steering mechanism the steering-post *c* is rotated, by which the worm-wheel is caused to move, and with it the extremity of the lever *h*, which latter describes an arc around the axis of the spindle *f*. By such means a determined position is given to the horizontally-disposed lever *j*, and this position is in turn communicated to the fore-carriage *p*. On either of the steering-wheels *q* coming into contact with an obstacle on the road the strain is taken up eventually by the lever *h*, whose position is positively fixed by the worm and worm-wheel gear.

What I claim as my invention, and desire to secure by Letters Patent, is—

1. Steering mechanism for motor road-vehicles, consisting in combination of a worm, means for causing the rotation thereof, a worm-wheel gearing with said worm, a lever integrally connected to said worm-wheel, a fore-carriage, links connected to each side of said fore-carriage, a lever to whose extremities the said respective links are connected, and a link connection between said first and last named lever, substantially as described.

2. Steering mechanism for motor road-vehicles consisting in combination of a steering-post, a worm mounted thereon, a worm-wheel gearing with said worm, a lever integrally connected to said worm-wheel, a fore-carriage, links connected to each side of said fore-carriage, a lever to whose extremities the said respective links are connected, and a link connection between said first and last named lever, substantially as described.

3. Steering mechanism for motor road-vehicles, consisting in combination of a steering-post, a worm mounted thereon, a worm-wheel gearing with said worm, a lever integrally connected to said worm-wheel, a fore-carriage, links connected to each side of said fore-carriage, a lever to whose extremities the said respective links are connected, a link connection between said first and last named lever, said link connection being jointed to permit of relative movement of the respective levers, substantially as described.

4. Steering mechanism for motor road-vehicles, consisting in combination of a steering-post, a worm mounted thereon, a worm-wheel gearing with said worm, a lever integrally connected to said worm-wheel, a fore-carriage, links connected to each side of said fore-carriage, said links being jointed to permit of the relative movement of the fore-carriage, a lever to whose extremities the said respective links are connected, and a link connection between said first and last named lever, substantially as described.

5. Steering mechanism for motor road-vehicles consisting in combination of two worms, means for causing the rotation thereof, worm-wheels gearing respectively with said worms, levers respectively integrally connected to said worm-wheels, a fore-carriage, links connected to each side of said fore-carriage, a lever to whose extremities the said respective links are connected, and a link connection between said levers and lever respectively, substantially as described.

In testimony whereof I have signed my name to this specification in the presence of two subscribing witnesses.

CHAS. C. WRIGHT.

Witnesses:
ALBERT E. SMITH,
WILLIAM EDWARD EVANS.